(12) United States Patent
Houri et al.

(10) Patent No.: US 8,140,692 B2
(45) Date of Patent: Mar. 20, 2012

(54) FLEXIBLY CONFIGURED PRESENCE SERVER

(75) Inventors: Avshalom Houri, Netivot (IL); Gil Perzy, Holon (IL); Galina Rubinshtein, Holon (IL); Uri Segev, Or-Yehuda (IL); Ofira Tal-Aviv, Rehovot (IL)

(73) Assignee: International Business Machines Corporation, Armonk, NY (US)

( * ) Notice: Subject to any disclaimer, the term of this patent is extended or adjusted under 35 U.S.C. 154(b) by 622 days.

(21) Appl. No.: 11/674,175

(22) Filed: Feb. 13, 2007

(65) Prior Publication Data
US 2007/0198589 A1 Aug. 23, 2007

Related U.S. Application Data

(60) Provisional application No. 60/772,542, filed on Feb. 13, 2006.

(51) Int. Cl.
*G06F 15/16* (2006.01)
(52) U.S. Cl. ........ 709/229; 709/203; 709/225; 709/227; 380/233; 713/153; 713/193
(58) Field of Classification Search .................. 709/229, 709/203, 225, 227; 380/233; 713/153, 193
See application file for complete search history.

(56) References Cited

U.S. PATENT DOCUMENTS

| | | | | |
|---|---|---|---|---|
| 7,606,818 | B2* | 10/2009 | Bachmann et al. | 1/1 |
| 7,707,286 | B2* | 4/2010 | Gundu et al. | 709/224 |
| 2003/0217142 | A1* | 11/2003 | Bobde et al. | 709/224 |
| 2004/0059781 | A1* | 3/2004 | Yoakum et al. | 709/204 |
| 2004/0111530 | A1* | 6/2004 | Sidman | 709/245 |
| 2005/0228895 | A1* | 10/2005 | Karunamurthy et al. | 709/229 |
| 2006/0246880 | A1* | 11/2006 | Baldwin et al. | 455/414.2 |
| 2007/0150491 | A1* | 6/2007 | Torvinen | 707/100 |
| 2007/0198589 | A1* | 8/2007 | Houri et al. | 707/104.1 |
| 2008/0140720 | A1* | 6/2008 | Six et al. | 707/104.1 |
| 2008/0155038 | A1* | 6/2008 | Bachmann et al. | 709/206 |

* cited by examiner

*Primary Examiner* — Thu Ha Nguyen
(74) *Attorney, Agent, or Firm* — Raymond Szeto; Hoffman Warnick LLC (57) ABSTRACT

A presence server includes a receiver to receive a variety of publishing and subscribe requests from a variety of sources; a plurality of elements to process the requests; and a presence manager to flexibly configure the elements as a function of the type of the requests received. A method for processing presence information includes receiving a variety of publishing and subscribe requests from a variety of sources; processing the requests with a plurality of elements; and configuring the elements as a function of the type of the requests received.

17 Claims, 6 Drawing Sheets

FLEXIBLY CONFIGURED PRESENCE SERVER

CROSS-REFERENCE TO RELATED APPLICATIONS

This application claims benefit from U.S. Provisional Patent Application No. 60/772,542, filed Feb. 13, 2006, which is hereby incorporated in its entirety by reference.

FIELD OF THE INVENTION

The present invention relates to presence servers in computer network environments generally and to a flexibly configured presence server for processing presence information from various sources in particular.

BACKGROUND OF THE INVENTION

Presence servers are known in the art. Such servers receive and maintain presence information regarding entities, such as computer or cell phone users, and provide presence information about the entities to subscribers. Accordingly, presence servers receive requests from publishing entities to publish presence information, as well as subscription requests from subscribing entities wishing to receive the published presence information.

Publishing entities are logical sources of information, such as an individual. The individual may have a cell phone and a personal computer, both of which are capable of providing presence information regarding the same individual at the same time. The presence information from the cell phone may differ or even conflict with the presence information from the personal computer. Other sources of presence information for an individual include, for example, telephones, mobile devices, personal devices and laptop computers. A presence server combines the presence information received from these disparate sources in order to create a single consistent view of the status of the publishing entity (i.e. the individual).

Figure 1:
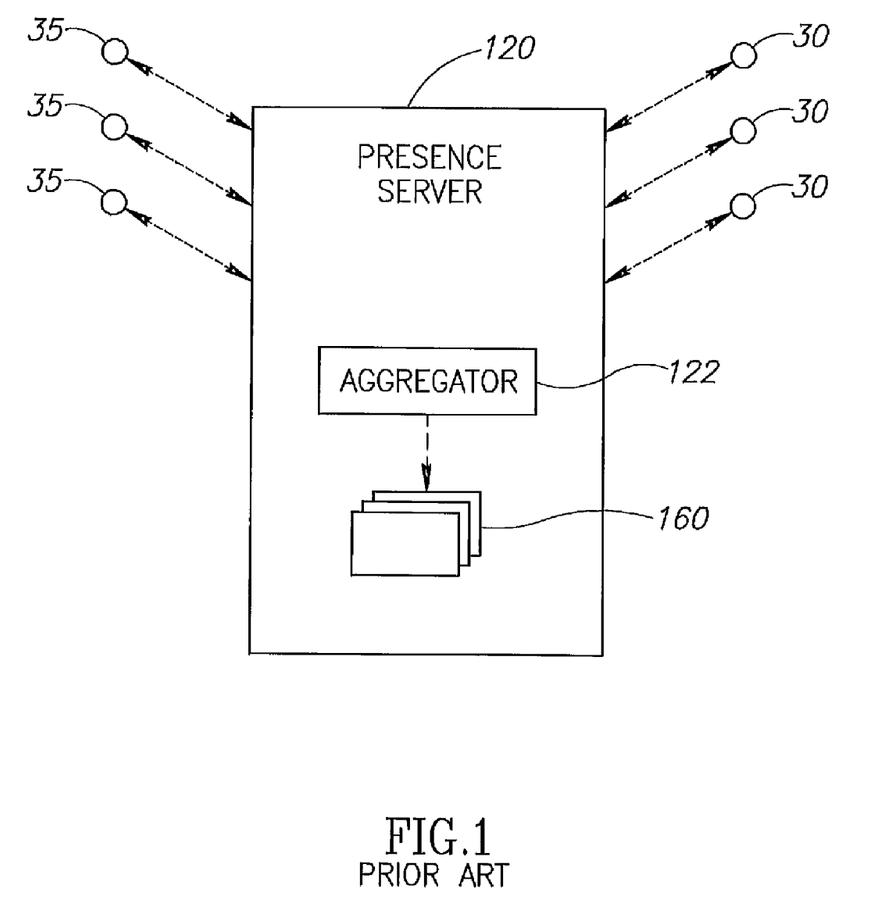
FIG. 1 is a schematic drawing of a prior art presence server.

FIG. 1, to which reference is now made, illustrates the manner in which a typical presence server 120 processes incoming presence information from publishing entities 30 and provides notification services to their associated subscribing entities 35. Publishing entities 30 "publish" presence information by sending it to presence server 120. Subscribing entities 35 "subscribe" to specific publishing entities 30 by sending requests to presence server 120.

Presence server 120 comprises an aggregator 122. Aggregator 122 aggregates presence information received from publishing entities 30, and uses it to compose a presence information document 160 for each of publishing entities 30. Presence server 120 sends copies of these presence information documents 160 to each subscribing entity 35 associated with the specific publishing entity for which each document 160 was composed.

SUMMARY OF THE INVENTION

An object of the present invention is to improve upon the prior art.

There is therefore provided, in accordance with an embodiment of the present invention, a receiver for receiving a variety of publishing and subscribe requests from a variety of sources; a plurality of elements for processing the request; and a presence manager for flexibly configuring the elements as a function of a type of the requests received.

Further in accordance with an embodiment of the present invention, the plurality of elements include a plurality of aggregators, each aggregator aggregating presence segments from one type of entity; and an aggregator manager for analyzing an incoming publishing request and for activating at least one of the aggregators which is compatible with the request.

Still further, in accordance with an embodiment of the present invention, the sources include at least one of the following entities: a computer, a cell phone, a telephone, a personal digital assistant, a printer, and a fax machine.

Additionally, in accordance with an embodiment of the present invention, the aggregators are removable.

Moreover, in accordance with an embodiment of the present invention, the plurality of elements includes a resource list manager for retrieving a list of resources from at least one resource list.

Further in accordance with an embodiment of the present invention, the resource list manager includes means for accessing a URL to receive a requested resource list and means for providing the resource list to the presence manager.

Still further, in accordance with an embodiment of the present invention, the presence manager comprises means for processing an individual subscribe request for each member of the resource list.

Additionally, in accordance with an embodiment of the present invention, the plurality of elements includes an external provider manager for retrieving additional information about resources available from external providers.

There is also provided in accordance with an embodiment of the present invention, a method for processing presence information, the method including receiving a variety of publishing and subscribe requests from a variety of sources; processing the requests with a plurality of elements; and configuring the elements as a function of a type of the requests received.

Moreover, in accordance with an embodiment of the present invention, the processing includes analyzing each publishing request received from a logical entity to determine its type; selecting an appropriate aggregator from among a set of pluggable aggregators to process each type of request; and aggregating presence information segments from each type.

Further in accordance with an embodiment of the present invention, the processing includes selecting an associated document processor to process each segment; and creating a presence information document by manipulating and verifying all the segments from the logical entity.

Still further, in accordance with an embodiment of the present invention, the sources include at least one of the following entities: a computer, a cell phone, a telephone, a personal digital assistant, a printer, and a fax machine.

Additionally, in accordance with an embodiment of the present invention, the processing includes determining whether or not the subscribe request requires external provider information; forwarding a request for external provider information to an external provider registry; receiving the external provider information from the external provider registry; and including the external provider information in a presence information document.

Moreover, in accordance with an embodiment of the present invention, the processing includes determining whether or not the subscribe request is associated with a list of resources; forwarding a request for the list of resources to an resource list registry; receiving the resource list from the resource list registry; and creating a subscription for each member of the resource list.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Applicants have realized that people are not the only kinds of publishing entities. It is becoming more common to have physical resources, such as a printer or a fax machine, also provide publishing information. These devices may publish presence information analogous, although not necessarily equivalent, to the information published by human publishing entities. For example, presence information published by a computer user includes connection status, time since last activity, and whether or not he/she wished to be disturbed. A printer's presence information could include online/offline status and the number of print jobs waiting to print.

As described hereinabove, presence information may be published by a variety of logical sources of information. It will be appreciated that such information may now represent the presence status of both humans and electronic devices. It will also be appreciated that each such logical source of information may have a different format or notification requirements, each of which must be processed by the same aggregator. Furthermore, subscribers may wish to receive notifications regarding "rich" presence information, which may not be available directly from the publishing entities themselves. For example, a printer may publish its online/offline status, network location, and print queue information, but a subscriber may also be interested in knowing the speed at which it prints or the level of quality it may provide.

Figure 2:
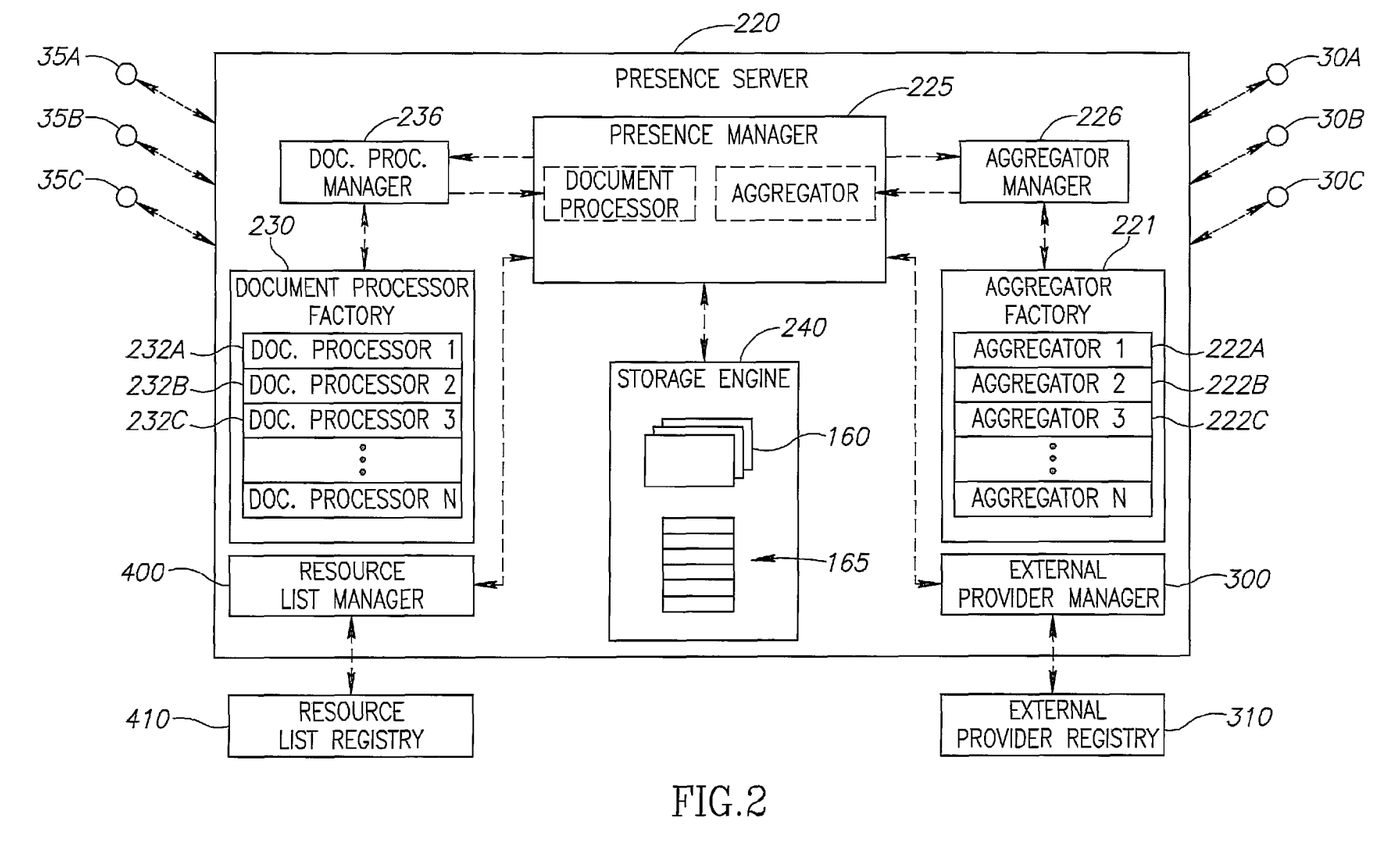
FIG. 2 is a schematic illustration of a novel presence server, constructed and operative in accordance with an embodiment of the present invention.

Applicants have realized that a flexibly configured presence server may provide a more robust and efficient platform for servicing presence information publication and notification requests. FIG. 2, to which reference is now made, illustrates a manner in which such a flexibly configured presence server 220, designed and operative in accordance with an embodiment of the present invention, may provide such servicing.

As in the prior art, flexibly configured presence server 220 may receive publication requests from publishing entities 30 (e.g., 30A-30C) and receive notification requests from subscriber entities 35 (e.g., 35A-35C). Presence server 220 may optionally also send information requests to an external provider registry 310 and a resource list registry 410. External provider registry 310 and resource list registry 410 may in turn send requested information to presence server 220.

Presence server 220 may comprise a presence manager 225, a document processing factory 230, a document processing manager 236, an aggregator factory 221, an aggregator manager 226, an external provider manager 300, a resource list manager 400, and a storage engine 240. Storage engine 240 may be a unit for the storing of persistent data during the course of presence sessions. It will be appreciated that storage engine 240 may be a logical unit; the actual data may be stored on a separate physical device.

Aggregator factory 221 may comprise a multiplicity of plug-in aggregators 222 (e.g., 222A-222C). Each of aggregators 222 may be associated with a specific type of presence information. For example, aggregator 222A may be associated with someone using a cell phone, aggregator 222B may be associated with a computer user, and aggregator 222C may be associated with a printer. Similarly, document processor factory 230 may comprise a multiplicity of document processors 232 (e.g., 232A-232C), each of which may be associated with one or more aggregators 222.

Presence manager 225 may provide a framework for processing publishing requests as they are received from publishing entities 30. Aggregator manager 226 may analyze an incoming publishing request to determine its compatibility with aggregators 222. The appropriate aggregator 222 may then be selected from aggregator factory 221 and "plugged in" to presence manager 225 in order to process the presence information contained in the request. This processed presence information is then stored as presence information segments 165 by storage engine 240.

After a presence information segment 165 has been processed for a publishing request, all of the segments 165 associated with the relevant publishing entity may be retrieved via storage engine 240. These segments 165 may be input to presence manager 225 and may be used by the associated aggregator 222 to compose a full presence information document for publishing entity 30. A document processor 232 associated with the relevant aggregator 222 may then be "plugged in" by document processing manager 236 to presence manager 225. Document processor 232 may further manipulate and verify the composed presence information document 160.

It will be appreciated that multiple physical sources of information may be simultaneously publishing for a single logical entity. Therefore more than one aggregator 222 and/or document processor 232 may be used to compose a single presence information document 160. These "pluggable" units may be limited to formatting operations, allowing presence server 220 to handle publish/subscribe/notify operations in a format independent manner.

Subscribing entity 35A may send a subscribe request to presence server 220, requesting presence information regarding publishing entity 30A. Publishing entity 30A may be, for example, a printer. As such, it may publish some relevant information, including, for example, printer type, network location and online/offline status. Subscribing entity 35A may request to receive additional information not directly published by publishing entity 30A. For example, it may be advantageous for subscribing entity 35A to know how fast the printer may print and what options it may have for print resolution.

Such additional information may be available via external provider manager 300. External provider manager 300 may comprise means to communicate with external provider registry 310 which may include a table of expanded information that may be associated with specific subscribing entities 30. For example, external provider registry 310 may comprise a table listing types of printers, their associated resolution options, and the print speeds associated with each such option. It will be appreciated that provider registry 310 may be a logical unit; its associated data may or may not be located on the same physical device as external provider manager 300.

In accordance with an embodiment of the present invention, subscribing entity 35A may send a subscribe request to presence server 220. The request may indicate that subscribing entity 35A requests "rich" presence information regarding publishing entity 30A. Presence manager 225 may send a rich information request to external provider manager 300, including, for example, the printer type from publishing entity 30A. External provider manager 300 may use the received printer type to look up the relevant additional information in provider registry 310, and then send this information back to presence manager 225.

As in the previous embodiment, aggregator manager 226 may select an appropriate aggregator 222 and document processor 232 to process the externally provided information and include it in a presence information document 160 to be associated with publishing entity 30A.

A subscribing entity 35 may also submit a subscribe request for a list of resources. Such a list may include, for example, all of the printers publishing in a given area, or all of the available publishing people with a certain skill or characteristic. Presence server 220 may not have the information necessary to determine the members of such a list, or it may be impractical for presence server 220 to devote the resources required to determine whom the list should include. In accordance with an embodiment of the present invention, such a list may be located via a resource list manager 400. Resource list manager 400 may comprise means to communicate with resource list registry 410 which may include resource lists that may be associated with subscribing requests. It will be appreciated that resource list registry 410 may be a logical unit; its associated data may or may not be located on the same physical device as resource list manager 400.

For example, subscribing entity 35B may request presence information for all of the printers on the third floor of a specific office building. The relevant printers may include, for example, publishing entities 30A, 30B and 30C. Presence manager 225 may send a request to resource list manager 400 to acquire a list of the relevant subscribing entities 30. Resource list manager 400 may lookup the requested list in resource list registry 410, and may send the list to presence manager 225. Presence manager 225 may use the received resource list to interpret the original request from subscribing entity 35B as three separate requests for information on subscribing entities 30A, 30B and 30C. It will be appreciated that resource list manager 400 may continue to update presence server 220 regarding changes in the requested list as long as the subscribing request may remain valid.

It will be appreciated that external provider manager 300 and resource list manager 400 may use APIs to communicate with presence server 220 and accordingly may be developed without specific knowledge of the internal workings of presence server 220.

Similarly, aggregators 222 and document processors 232 may also be developed without specific knowledge of the internal workings of presence server 220. Accordingly, it will be appreciated that, unlike in the prior art, it may not be necessary to modify the existing aggregator 122 (FIG. 1) in order to process a new form of presence information. Such modification may entail the introduction of processing errors ("bugs") in previously working modules. Furthermore, the required added processing logic may also slow overall performance and complicate future maintenance tasks. Instead, using the present invention, the logic required to process new forms of presence information may be compartmentalized in configurable modules, which may be developed separately without impacting on the existing framework.

In accordance with an embodiment of the present invention, publishing entities 30 and subscribing entities 35 may use SIP (Session Initiation Protocol) for communication. Publishing and subscribing entities 30 and 35 may use one or more SIP clients (for example, on a personal computer and/or telephone) to create such requests that are forwarded to presence servers 120. These clients may also be used to interpret the notifications received from presence server 220. The remaining explanation will be provided using the SIP protocol. It will be appreciated that the present invention may also be implemented in other protocols.

Figure 3A:
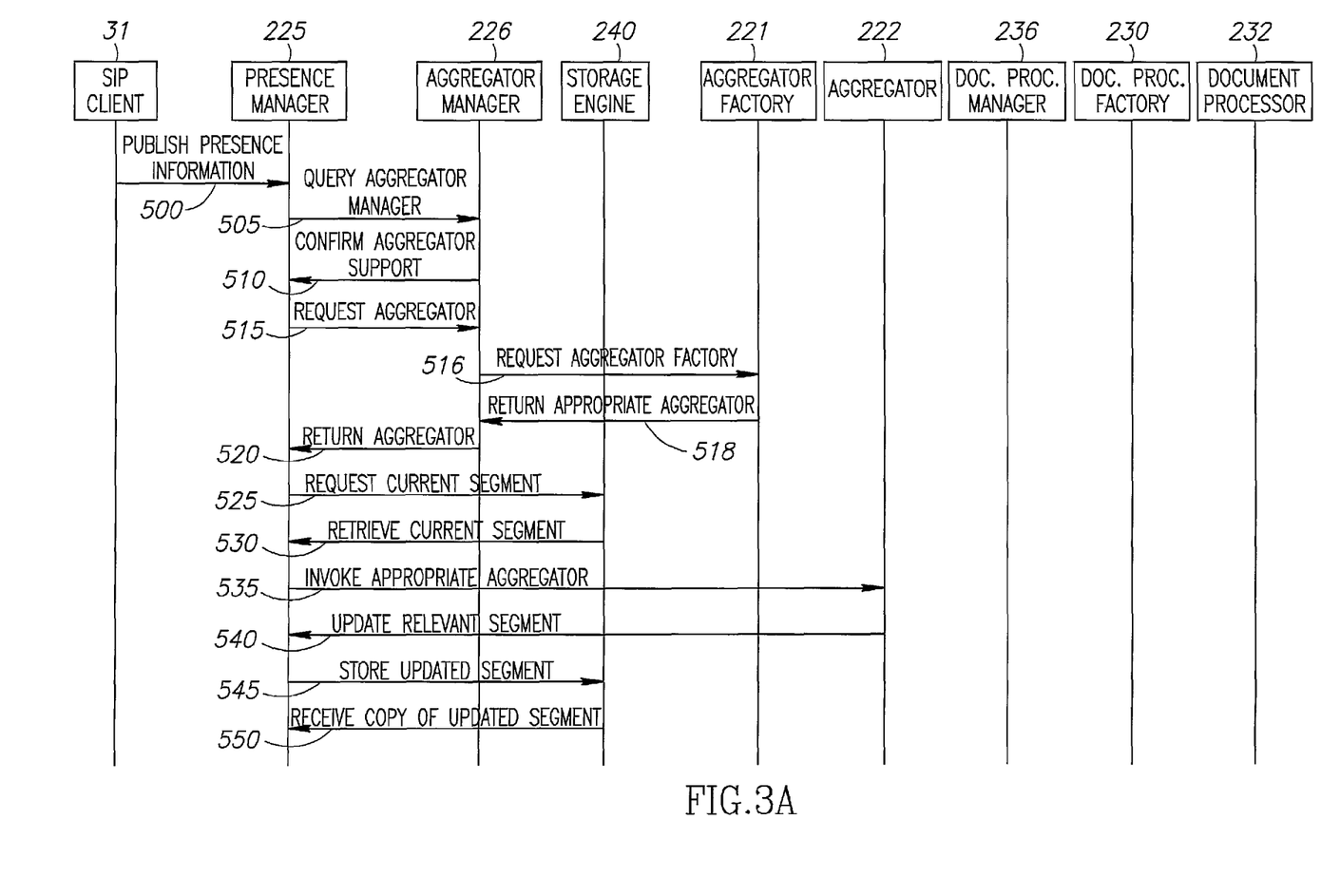
FIGS. 3A, 3B, 4 and 5 are flow charts of control between the various entities included in the presence server illustrated in FIG. 2.
Figure 3B:
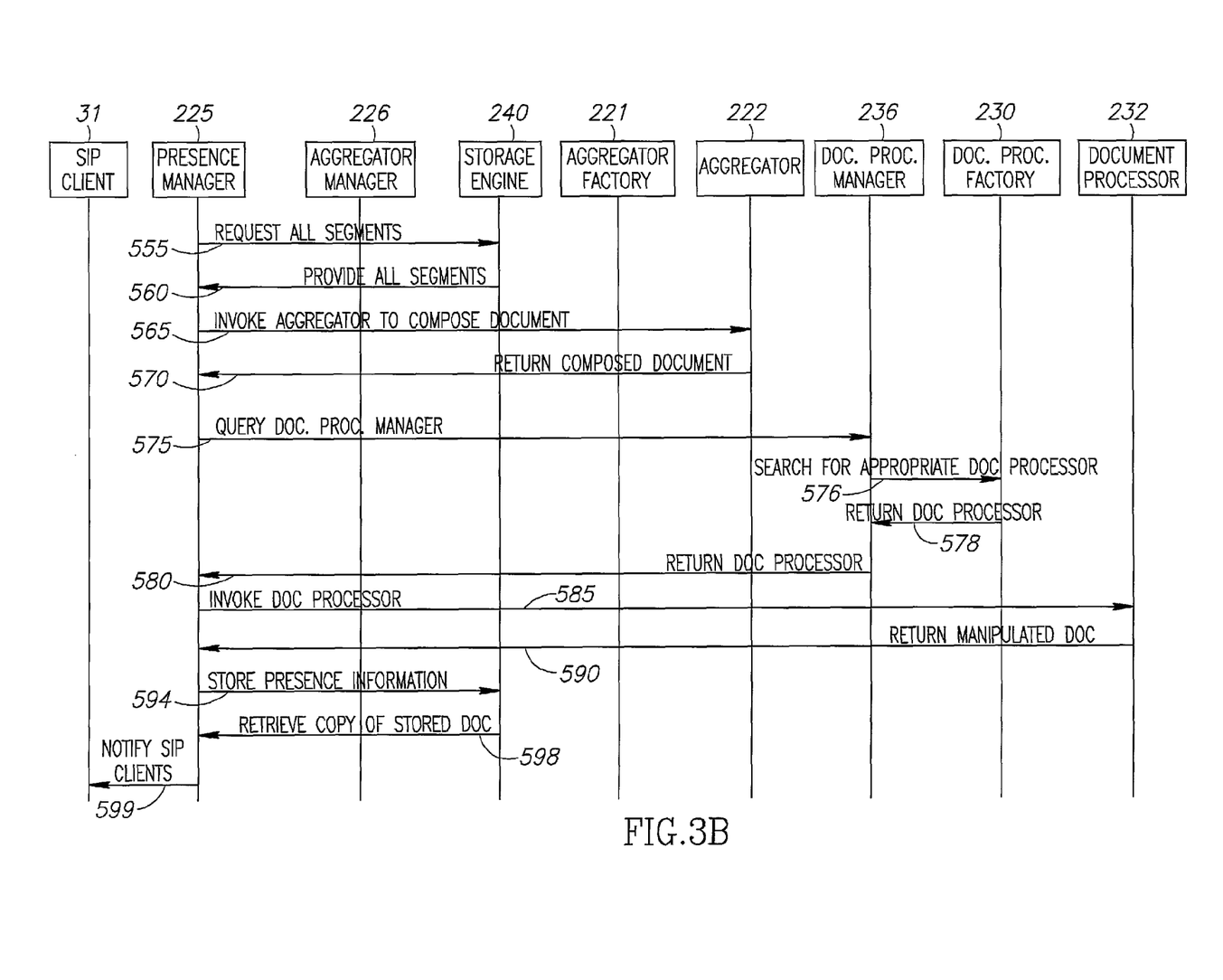

Reference is now also made to FIGS. 3A and 3B which together illustrate the flow for processing publishing requests. The top rows show the objects that may be involved in the various processes, and the succeeding rows show the process steps as per the order in which they may be performed. Similar reference numerals may refer to similar objects in FIG. 2.

SIP client 31 may publish (arrow 500) presence information to presence server 220 (FIG. 2). Presence manager 225 may query (arrow 505) aggregator manager 226 to establish whether or not such information is supported by at least one of aggregators 222. Aggregator manager 226 may confirm (arrow 510) aggregator support to presence manager 225. In the event that support is not available an error message may be generated and the process halted.

Presence manager may request (arrow 515) that aggregator manager 226 provide an appropriate aggregator 222 to process the incoming information. Aggregator manager 226 may search (arrow 516) aggregator factory 221 which may return (arrow 518) the appropriate aggregator 222. Aggregator manager 226 may then return (arrow 520) this information to presence manager 225.

Presence manager 225 may request (arrow 525) the current version of the relevant segment 165 (FIG. 2) from storage engine 240. Storage engine 240 may then retrieve (arrow 530) the requested segment for presence manager 225. Processing may continue even if no previous version of the segment may be located. Presence manager 225 may invoke (arrow 535) the appropriate aggregator 222 (as identified previously) to process the published information and update (arrow 540) the relevant segment 165.

Presence manager 225 may store (arrow 545) updated segment through storage engine 240, and receive (arrow 550) an updated copy of segment 165 from storage engine 240. Presence manager 225 may also request (arrow 555) storage engine 240 to provide (arrow 560) all of the segments 165 associated with SIP client 31. Presence manager 225 may invoke (arrow 565) aggregator 222 to compose a presence information document 160 (FIG. 2) based on the retrieved segments 165. Aggregator 222 may return (arrow 570) the composed document 160 to presence manager 225.

Presence manger 225 may query (arrow 575) document processing manager 236 to search (arrow 576) document processor factory 230 which may return (arrow 578) an appropriate document processor 232. Document processor manager 226 may return (arrow 580) this information to presence manager 225. Presence manager 225 may invoke (arrow 585) document processor 232 to manipulate and verify presence information document 160. Document processor 232 may return (arrow 590) manipulated document 160 to presence manager 225.

It will be appreciated that there may be publishing entities 30 (FIG. 2) for which there may be multiple physical sources publishing presence information in disparate formats. In such cases, multiple aggregators 222 and document processors 232 may be invoked serially until presence information document 160 may be fully composed and manipulated.

Presence manager 225 may store (arrow 594) presence information document 160 using storage engine 240. Storage engine 240 may then retrieve (arrow 598) a copy of the stored document 160 for presence manager 225. Presence manager 225 may then notify (arrow 599) SIP clients 31 associated with subscribing entities 35 that have subscribed to the relevant publishing entity 30.

Figure 4:
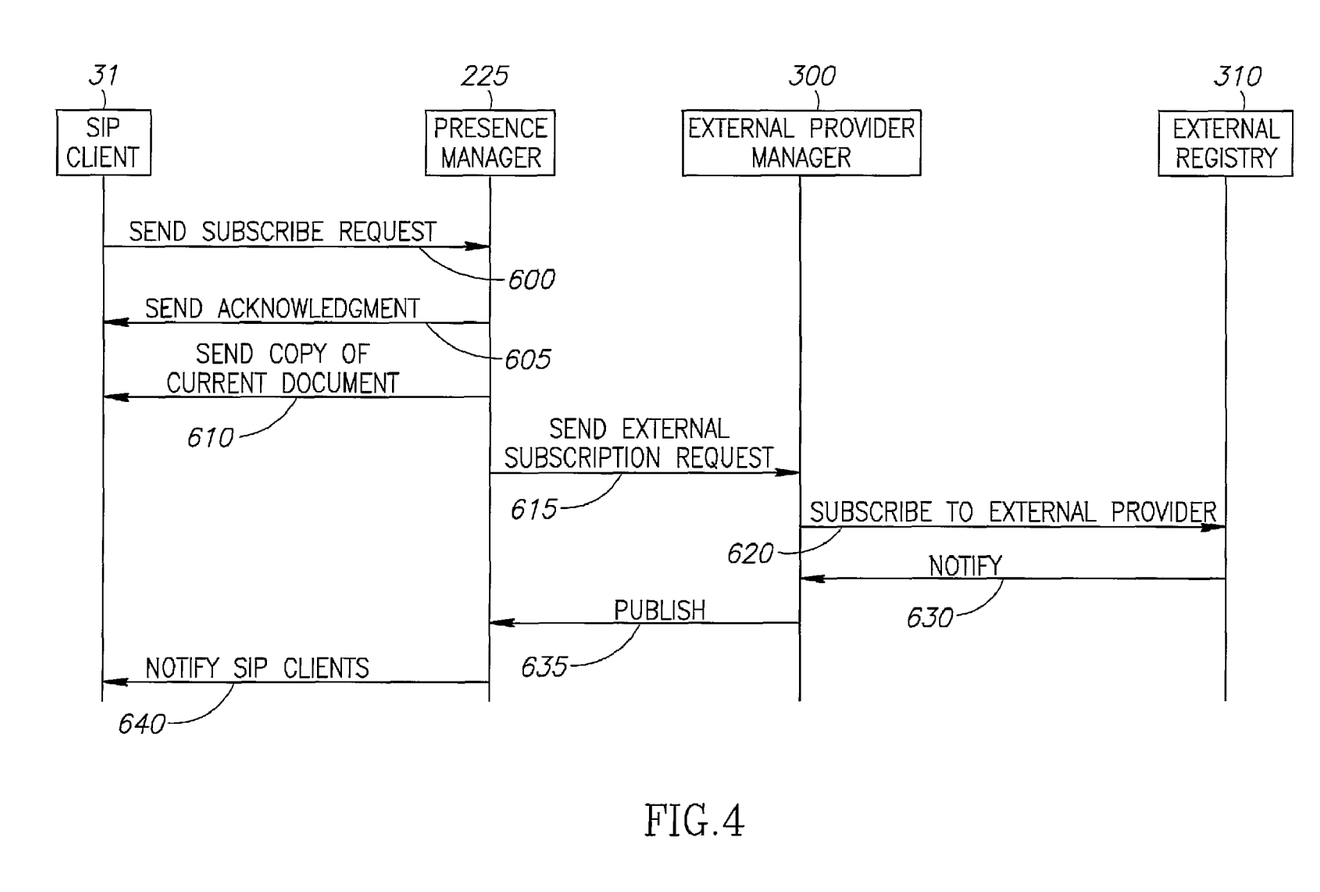

Reference is now also made to FIG. 4 which illustrates the flow for processing subscribe requests for externally provided information. The top row shows the objects that may be involved in the various processes, and the succeeding rows show the process steps as per the order in which they may be performed. Similar reference numerals may refer to similar objects in FIGS. 2 and 3.

SIP client 31 may send (arrow 600) a subscribe request for externally provided presence information to presence server 220 (FIG. 2). Presence manager 225 may send (arrow 605) an OK response to acknowledge the request. Presence manager 225 may also send (arrow 610) SIP client 31 a copy of the most recently generated presence information document 160 (FIG. 2) associated with the relevant publishing entity 30. Presence manager 225 may send (arrow 615) an external subscription request to external provider manager 400.

External provider manager 300 may subscribe (arrow 620) to the relevant external provider registry 310. External provider registry 310 may notify (arrow 630) external provider manager 300 with the requested presence information. External provider manager 300 may publish (arrow 635) this information to presence server 225. Presence manager 225 may include the published information in an updated presence information document 160 as described hereinabove. Presence manager 225 may notify (arrow 640) SIP client with the updated presence information document 160. It will be appreciated that as long as SIP client 31 remains subscribed to a given external provider registry 310, external provider manager 410 may periodically provide updates of the requested information (where relevant).

Figure 5:
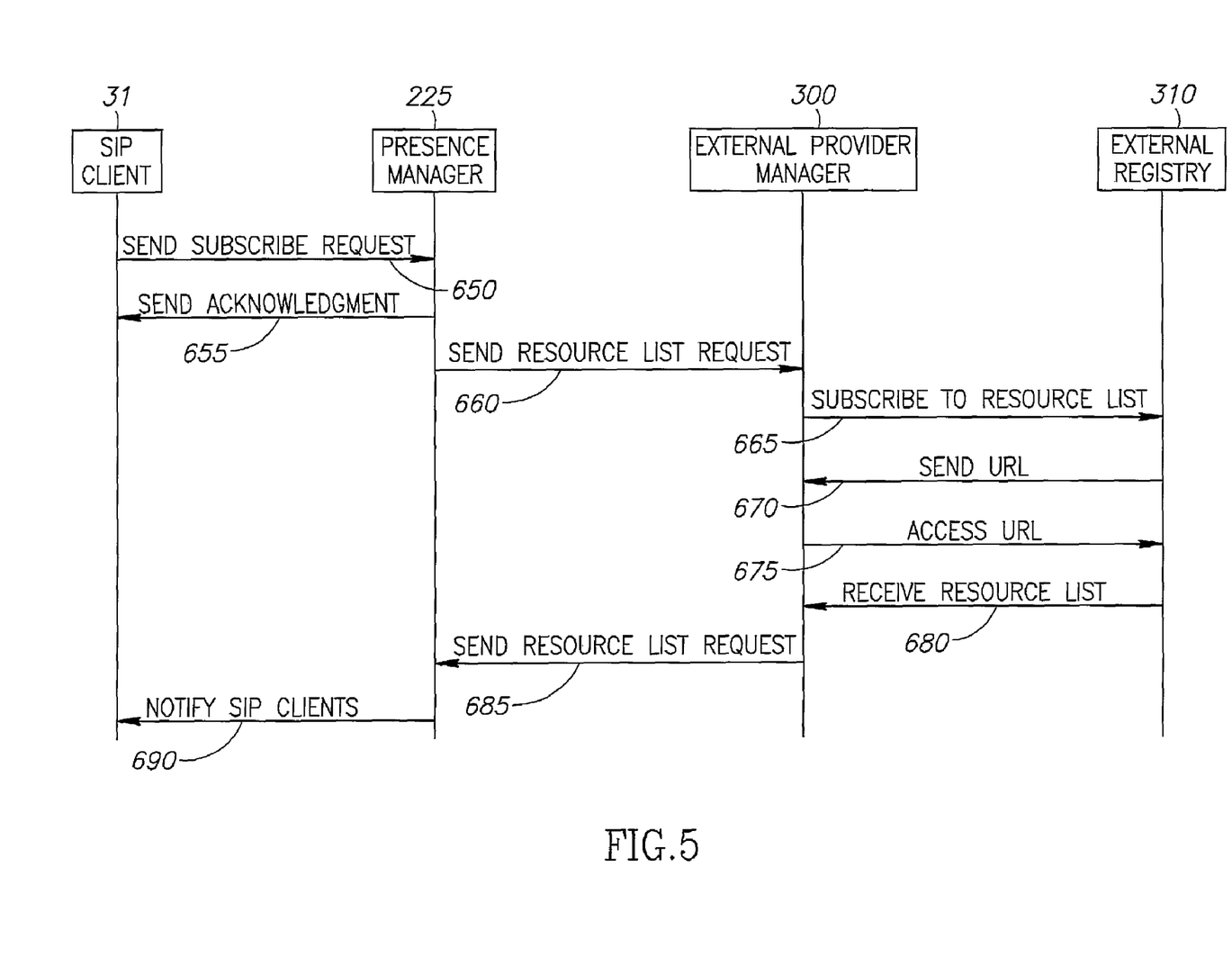

Reference is now also made to FIG. 5 which illustrates the flow for processing subscribe requests for resource lists. The top row shows the objects that may be involved in the various processes, and the succeeding rows show the process steps as per the order in which they may be performed. Similar reference numerals may refer to similar objects in FIG. 2.

SIP client 31 may send (arrow 650) a subscribe request for a resource list to presence server 220 (FIG. 2). Presence manager 225 may send (arrow 655) an OK response to acknowledge the request. Presence manager 225 may send (arrow 660) a resource list request to resource list manager 400.

Resource list manager 400 may subscribe (arrow 665) to the relevant resource list registry 410. Resource list registry 410 may send (arrow 670) a URL for the relevant resource list to resource list manager 300. Resource list manager 400 may access (arrow 675) the URL and receive (arrow 680) the request resource list from resource list registry 410.

Resource list manager 400 may send (arrow 685) the resource list to presence manager 225. Presence manager 225 may then process an individual subscribe request for each of the list's members. Presence manager 225 may notify (arrow 690) SIP client 31 with the associated updated presence information documents 160 (FIG. 2) as they are generated. It will be appreciated that as long as SIP client 31 remains subscribed to a given resource list, resource list manager 410 will periodically provide updates of the list's members (where relevant).

In an exemplary embodiment of the present invention, presence server 220 (FIG. 2) may be implemented using standard J2EE specification as defined by Sun Microsystems, Inc. of the United States. Presence servers 120 may be deployed on IBM J2EE application servers. Similarly, J2EE may be used to develop and implement external provider manager 300, resource list manager 400 and "pluggable" components such as aggregators 222 and document processors 232.

It will be appreciated that other standard technologies may be used in addition to, or in place of J2EE to develop and implement the components as described hereinabove. It will similarly be appreciated other session protocols may be used in addition to, or in place of SIP to implement communication between presence server 220 and publishing and subscribing entities 30 and 35 as described hereinabove.

In the above detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Unless specifically stated otherwise, as apparent from the above discussions, it is appreciated that, throughout the specification, discussions utilizing terms such as "processing," "computing," "calculating," "determining," or the like, refer to the action and/or processes of a computer, computing system, or similar electronic computing device that manipulates and/or transforms data represented as physical, such as electronic, quantities within the computing system's registers and/or memories into other data similarly represented as physical quantities within the computing system's memories, registers or other such information storage, transmission or display devices.

Embodiments of the present invention may include apparatus for performing the operations herein. This apparatus may be specially constructed for the desired purposes, or it may comprise a general-purpose computer selectively activated or reconfigured by a computer program stored in the computer. Such a computer program may be stored in a computer readable storage medium, such as, but not limited to, any type of disk, including floppy disks, optical disks, magnetic-optical disks, read-only memories (ROMs), compact disc read-only memories (CD-ROMs), random access memories (RAMs), electrically programmable read-only memories (EPROMs), electrically erasable and programmable read only memories (EEPROMs), magnetic or optical cards, Flash memory, or any other type of media suitable for storing electronic instructions and capable of being coupled to a computer system bus.

The processes and displays presented hereinabove are not inherently related to any particular computer or other apparatus. Various general-purpose systems may be used with programs in accordance with the teachings herein, or it may prove convenient to construct a more specialized apparatus to perform the desired method. The desired structure for a variety of these systems will appear from the description above. In addition, embodiments of the present invention are not described with reference to any particular programming language. It will be appreciated that a variety of programming languages may be used to implement the teachings of the invention as described herein.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A presence server comprising:
a computing device including:
a receiver for receiving a variety of publishing and subscribe requests from a variety of sources;
a plurality of elements for processing the requests; and
a presence manager for flexibly configuring the plurality elements as a function of a type of the requests received;
wherein the plurality of elements comprises:
a plurality of aggregators, each aggregator aggregating presence segments from one type of entity;
an aggregator manager for analyzing an incoming publishing request and for activating at least one of the aggregators which is compatible with the incoming publishing request; and
an external provider manager for retrieving rich presence information, associated with a publishing request from an external provider, wherein the rich presence information is not included in the associated publishing request, to enhance information provided in the associated publishing request.

2. The presence server according to claim 1, wherein the sources comprise at least one of the following entities: a computer, a cell phone, a telephone, a personal digital assistant, a printer, and a fax machine.

3. The presence server according to claim 1, wherein the aggregators are removable.

4. The presence server according to claim 1, wherein the plurality of elements comprises a resource list manager for retrieving a list of resources from at least one resource list.

5. The presence server according to claim 4, wherein the resource list manager comprises means for accessing a URL to receive a requested resource list and means for providing the resource list to the presence manager.

6. The presence server according to claim 5, wherein the presence manager comprises a processing system for processing an individual subscribe request for each member of the resource list.

7. The presence server according to claim 1, wherein the external provider manager retrieves the rich presence information from the at least one external provider in response to a subscribe request.

8. A method for processing presence information comprising:
receiving a variety of publishing and subscribe requests from a variety of sources;
processing, using a computer device, the requests with a plurality of elements; and
configuring the elements as a function of a type of the requests received;
wherein the processing comprises:
analyzing each publishing request received from a logical entity to determine its type;
selecting an appropriate aggregator from among a set of pluggable aggregators to process each type of request;
aggregating presence information segments from each type;
receiving rich presence information, associated with a publishing request from an external provider, wherein the rich presence information is not included in the associated publishing request; and
including the rich presence information in a presence information document to enhance information provided in the associated publishing request.

9. The method according to claim 8, wherein the processing comprises:
selecting an associated document processor to process each segment; and
creating a presence information document by manipulating and verifying all the segments from the logical entity.

10. The method according to claim 8, wherein the sources comprise at least one of the following entities: a computer, a cell phone, a telephone, a personal digital assistant, a printer, and a fax machine.

11. The method according to claim 8, wherein the processing comprises:
forwarding, in response to a subscribe request associated with a list of resources, a request for the list of resources to a resource list registry;
receiving the resource list from the resource list registry; and
creating a subscription for each member of the resource list.

12. The method according to claim 8, further comprising:
receiving a subscribe request for the rich presence information; and
retrieving the rich presence from the at least one external provider in response to the subscribe request.

13. A computer product stored on a non-transitory storage medium and readable by a computing system, embodying a program of instructions executable by the computing system for processing presence information, for performing the steps of:
receiving a variety of publishing and subscribe requests from a variety of sources;
processing the requests with a plurality of elements; and
configuring the elements as a function of a type of the requests received;
wherein the processing comprises:
analyzing each publishing request received from a logical entity to determine its type;
selecting an appropriate aggregator from among a set of pluggable aggregators to process each the type of request;
aggregating presence information segments from each type;
receiving rich presence information, associated with a publishing request from an external provider, wherein the rich presence information is not included in the associated publishing request; and
including the rich presence information in a presence information document to enhance information provided in the associated publishing request.

14. The computer product according to claim 13, wherein the processing comprises:
selecting an associated document processor to process each segment; and
creating a presence information document by manipulating and verifying all the segments from the logical entity.

15. The computer product according to claim 13, wherein the sources comprise at least one of the following entities: a computer, a cell phone, a telephone, a personal digital assistant, a printer, and a fax machine.

16. The computer product according to claim 13, wherein the processing comprises:
- forwarding, in response to a subscribe request associated with a list of resources, a request for the list of resources to a resource list registry;
- receiving the resource list from the resource list registry; and
- creating a subscription for each member of the resource list.

17. The computer program product according to claim 13, further comprising:
- receiving a subscribe request for the rich presence information; and
- retrieving the rich presence from the at least one external provider in response to the subscribe request.

\* \* \* \* \*